(12) United States Patent
Takeda et al.

(10) Patent No.: US 11,249,311 B2
(45) Date of Patent: Feb. 15, 2022

(54) VIRTUAL-IMAGE DISPLAY APPARATUS

(71) Applicant: SEIKO EPSON CORPORATION, Tokyo (JP)

(72) Inventors: Takashi Takeda, Suwa (JP); Mitsutaka Ide, Shiojiri (JP); Akira Komatsu, Tatsuno-machi (JP); Masayuki Takagi, Azumino (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 360 days.

(21) Appl. No.: 16/357,669

(22) Filed: Mar. 19, 2019

(65) Prior Publication Data

US 2019/0293940 A1    Sep. 26, 2019

(30) Foreign Application Priority Data

Mar. 20, 2018  (JP) .............................. JP2018-052136

(51) Int. Cl.
*G02B 27/01* (2006.01)

(52) U.S. Cl.
CPC ..... *G02B 27/0172* (2013.01); *G02B 27/0176* (2013.01); *G02B 2027/015* (2013.01); *G02B 2027/0118* (2013.01)

(58) Field of Classification Search
CPC ........................ G02B 27/01; G02B 27/0101; G02B 27/0172; G02B 27/0178; G02B 27/0176; G02B 2027/0118; G02B 2027/0132; G02B 2027/0127; G02B 2027/0147

See application file for complete search history.

(56) References Cited

U.S. PATENT DOCUMENTS

| | | | |
|---|---|---|---|
| 2003/0098955 A1* | 5/2003 | Okuyama | G03B 21/005 353/31 |
| 2005/0073651 A1* | 4/2005 | Yamamoto | G03B 21/005 353/20 |
| 2005/0180687 A1 | 8/2005 | Amitai | |
| 2010/0046070 A1* | 2/2010 | Mukawa | G02B 27/0176 359/480 |
| 2012/0313982 A1* | 12/2012 | Fukuzaki | G03B 33/12 345/690 |
| 2013/0169894 A1* | 7/2013 | Ouderkirk | G02B 27/283 349/9 |
| 2016/0131909 A1 | 5/2016 | Nakamura et al. | |

FOREIGN PATENT DOCUMENTS

| | | |
|---|---|---|
| CN | 107229119 A | 10/2017 |
| JP | 2016-090910 A | 5/2016 |
| WO | 03/081320 A1 | 10/2003 |
| WO | 2017-164573 A1 | 9/2017 |

* cited by examiner

*Primary Examiner* — Christopher Stanford
*Assistant Examiner* — Journey F Sumlar
(74) *Attorney, Agent, or Firm* — Oliff PLC

(57) ABSTRACT

Image formation is performed by using a synthesis optical system, and in a first dichroic film and a second dichroic film that are the synthesis surfaces in the synthesis optical system, a direction in which the cross axis that is the intersecting axis extends corresponds to a direction of alignment of eyes of an observer.

12 Claims, 15 Drawing Sheets

VIRTUAL-IMAGE DISPLAY APPARATUS

BACKGROUND

1. Technical Field

The present invention relates to a head-mounted display used by being mounted on a head, and other virtual-image display apparatuses.

2. Related Art

In a virtual-image display apparatus such as a head-mounted display, for example, not only an eyeglass-type image display apparatus, but also image display apparatuses other than the eyeglass type, such as so-called goggles-like and binoculars-like image display apparatuses, a small size of the apparatus is desired, and particularly, there is a desire to secure a wide angle and an eye ring diameter while retaining the small and thin size. In contrast, for example, as described in WO/2003/081320, it is known that an attempt is made to resolve the problem by providing multiple slit structures.

However, since the optical system described in WO/2003/081320 is accompanied by transmission and reflection by the slits on the structure, from the viewpoint of usage efficiency of light or the like, the above problem cannot necessarily be resolved while forming an image with a high quality, or an image with high brightness.

SUMMARY

A first virtual-image display apparatus according to an aspect of the invention includes a plurality of image elements configured to emit light of different wavelength bands to display an image, a synthesis optical system configured to synthesize the light from the image elements to form image light, and a display optical system configured to allow visual recognition of a virtual image formed by the image light passing through the synthesis optical system, and in the synthesis optical system, an intersecting axis of a synthesis surface for synthesizing each color light from the image elements extends along a direction corresponding to a lateral direction of the formed virtual image.

According to the virtual-image display apparatus described above, while enabling the formation of a high-efficiency and high-definition image using the synthesis optical system, the direction in which the intersecting axis of the synthesis surface in the synthesis optical system extends becomes correspondent with the lateral direction of the formed virtual image, that is, becomes correspondent with the direction of alignment of the eyes of an observer, due to which an appropriate eye ring diameter is formed to reduce loss of the virtual image in terms of visual recognition, and the compactness of each optical system, and consequently, the compactness of the apparatus can be achieved.

A second virtual-image display apparatus according to an aspect of the invention includes a first image element, a second image element, a third image element, a synthesis optical system configured to synthesize light from the first image element, the second image element, and the third image element to form image light, and first and second display optical systems configured to allow the image light to enter and configured to emit the image light, and the synthesis optical system includes a first synthesis surface and a second synthesis surface for synthesizing the light from the first image element, the second image element, and the third image element, and an intersecting axis of the first synthesis surface and the second synthesis surface intersects a plane perpendicular to a first direction in which the first display optical system and the second display optical system are arranged.

According to the virtual-image display apparatus described above, while enabling the formation of a high-efficiency and high-definition image using the synthesis optical system, the intersecting axis of the synthesis surfaces in the synthesis optical system intersects the plane perpendicular to the first direction in which the first display optical system and the second display optical system are arranged, due to which an appropriate eye ring diameter is formed to reduce loss of the virtual image in terms of visual recognition, and the compactness of each optical system, and consequently, the compactness of the apparatus can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Next, a virtual-image display apparatus according to an embodiment of the invention will be described with reference to FIG. 1 and other figures. Note that since the virtual-image display apparatus has a symmetrical structure formed by a left-right pair, typically only the structure corresponding to the left-eye side is illustrated in the figures and the right-eye side is omitted, however, the virtual-image display apparatus has a similar configuration on the right-eye side as well. First of all, as illustrated in the conceptual outline in FIG. 1, the virtual-image display apparatus 100 according to the present embodiment is applicable to a head-mounted display, and has an image formation unit 10 and a display optical system 2 as a set. The image formation unit 10 forms image light GL for displaying an image, and the display optical system 2 allows a virtual image formed by the image light GL passing through the image formation unit 10 to enter the eyes EY of an observer. As described above, the virtual-image display apparatus 100 guides the image light GL up to in front of the eyes EY of the observer, and brings the virtual image in visual contact with the observer.

Figure 1:
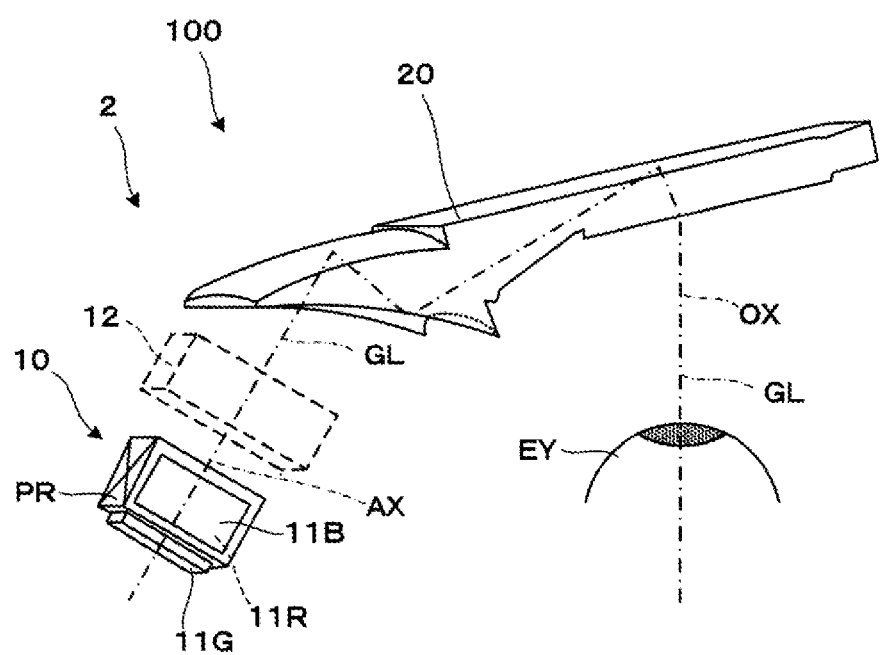
FIG. 1 is a conceptual perspective view illustrating an example of a virtual-image display apparatus according to an embodiment.
Figure 2A:
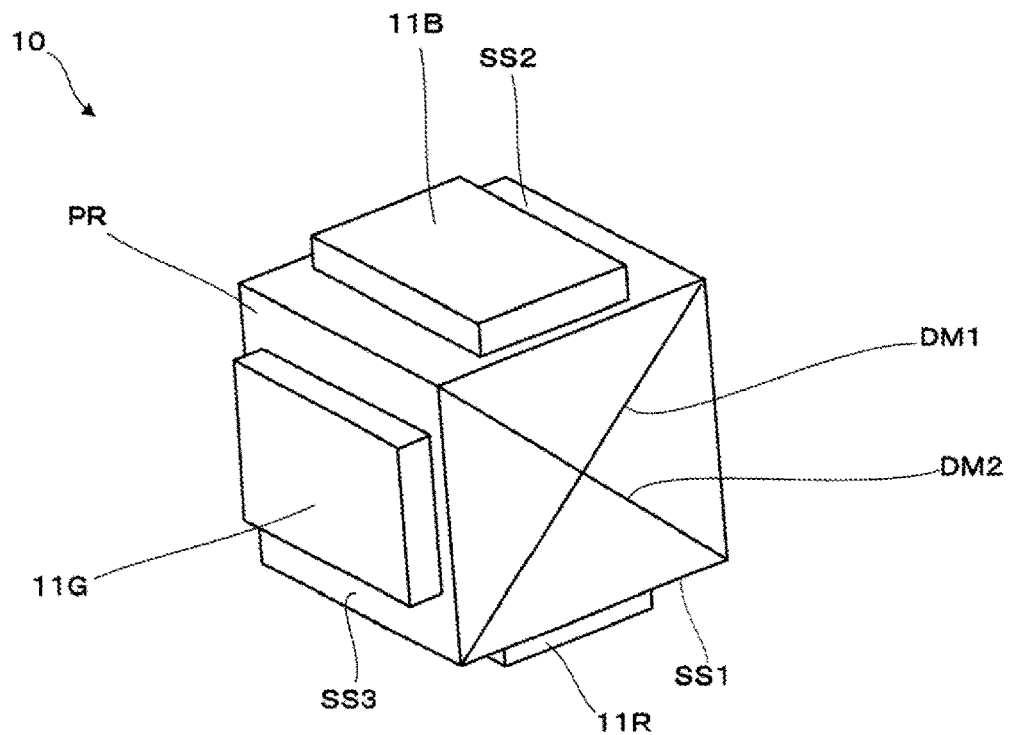
FIG. 2A is a perspective view for illustrating a configuration of a synthesis optical system.
Figure 2B:
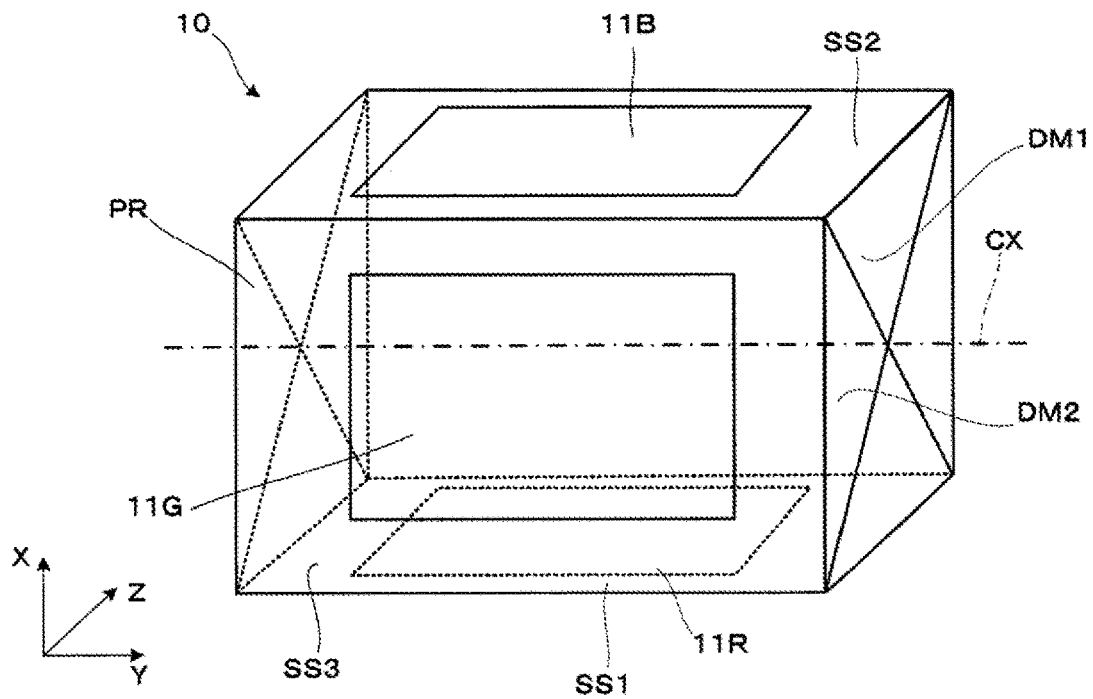
FIG. 2B is a conceptual perspective view for illustrating an arrangement of the synthesis optical system and image elements.

As illustrated in FIG. 1, FIG. 2A, and FIG. 2B, in the virtual-image display apparatus 100, the image formation unit 10 has image elements 11R, 11B, and 11G, and a synthesis optical system PR that is a prism for light synthesis, and the image formation unit 10 forms image light GL.

Each image element 11R, 11B, and 11G is an apparatus configured to form an image at a panel section as a main body section, and also emit respective color light to form the image light GL that is the formed image light, thereby serving as an image display section for displaying an image. Among each image element 11R, 11B, and 11G, the image element 11R is a first image element configured to emit light of red color wavelength band, the image element 11B is a second image element configured to emit light of blue color wavelength band, and the image element 11G is a third image element configured to emit light of green color wavelength band.

Each image element 11R, 11B, and 11G, for example, can be constituted by the image element that is constituted by a self-emitting element (OLED), such as an organic EL. In this case, an integrated member including each image element up to the light source can be constituted. Note that in addition to a spatial light modulating device such as a transmission-type liquid crystal panel, for example, each image element 11R, 11B, and 11G may be configured by including an illumination device (not illustrated) that is a backlight configured to emit illumination light, and a driving control unit (not illustrated) configured to control operations. Further, in the present embodiment, as each image element 11R, 11B, and 11G, a micro display for which the length of one side is equal to or less than one inch is adopted as a panel.

In the above case, since each image element 11R, 11B, and 11G forms an image in respective color wavelength band, the usage efficiency of light can be improved as compared to a case of a so-called single-plate type image element using a color filter, for example. In addition, when an organic EL (OLED) is used, then during the production of a luminous body, the sequential arrangement of the red, blue, green elements like in a single-plate type is not required, and each corresponding color may be configured, and therefore, as compared to a case of a single-plate type image element, a more high-definition configuration can be achieved. Note that as illustrated in the figure, each image element 11R, 11B, and 11G is attached on respective surfaces of the synthesis optical system PR.

The synthesis optical system PR is a cross dichroic prism configure to synthesize the color light modulated by each image element 11R, 11B, and 11G to generate image light GL. That is, the synthesis optical system PR, as illustrated in the figure, is a quadrangular prism-shaped member formed by attaching together four triangular prism-shaped prism members. As a more specific explanation, first of all, the four triangular prism-shaped prism members described above have a congruent shape, and the bottom surface forms an isosceles right triangle. The quadrangular prism-shaped member is formed by attaching together the side surface of the four triangular prism-shaped prism members so that the vertex of the right-angled section of the bottom surface is aligned. In this case, the ridges along the vertex of the bottom surface overlap each other, and a single intersecting axis is formed. Further, in the attached section that is the side surface of each triangular prism-shaped prism member, for example, two intersecting reflection surfaces are formed by a dichroic film including a dielectric multilayer. Here, each of a first dichroic film DM1 that is a first reflection surface, and a second dichroic film DM2 that is a second reflection surface is formed in order to emit the light from the first image element 11R and the second image element 11B, and also transmit the other components. That is, the first dichroic film DM1 (the first synthesis surface) and the second dichroic film DM2 (the second synthesis surface) function as the synthesis surface for synthesizing the color light from each image element 11R, 11B, and 11G. As a result of the configuration described above, each dichroic film DM1 and DM2 is arranged at an inclination of 45° with respect to the side surfaces SS1 to SS3 on which each image element 11R, 11B, and 11G is attached in the synthesis optical system PR, and intersects each other at 90°. Here, the single intersecting axis formed by overlapping of the ridges along the vertex of the bottom surface of the triangular prism-shaped prism members, that is, the intersecting axis formed by the intersection of the first dichroic film DM1 and the second dichroic film DM2 is the cross axis CX. Further, in the synthesis optical system PR, the direction in which the cross axis CX extends is the Y direction, and the direction of emission of image light is the Z direction. Note that the direction perpendicular to the Y direction and the Z direction for a right-handed system with respect to the Y direction and the Z direction specified as above is the X direction.

Next, with reference to FIG. 2B, the arrangement relationship between each image element 11R, 11B, and 11G as well as the synthesis optical system PR will be described. First of all, as illustrated in the figure, each image element 11R, 11B, and 11G is rectangularly shaped with the direction along the cross axis CX that is the intersecting axis as the long-side direction. That is, the light emitting surface in each image element 11R, 11B, and 11G is rectangularly shaped with the Y direction that is the direction along the cross axis CX as the long-side direction, and the direction perpendicular to the long-side direction as the short-side direction. In the case of the illustration, the Z-direction is the short-side direction in the first and the second image elements 11R and 11B, and the X direction is the short-side direction in the third image element 11G.

Figure 3:
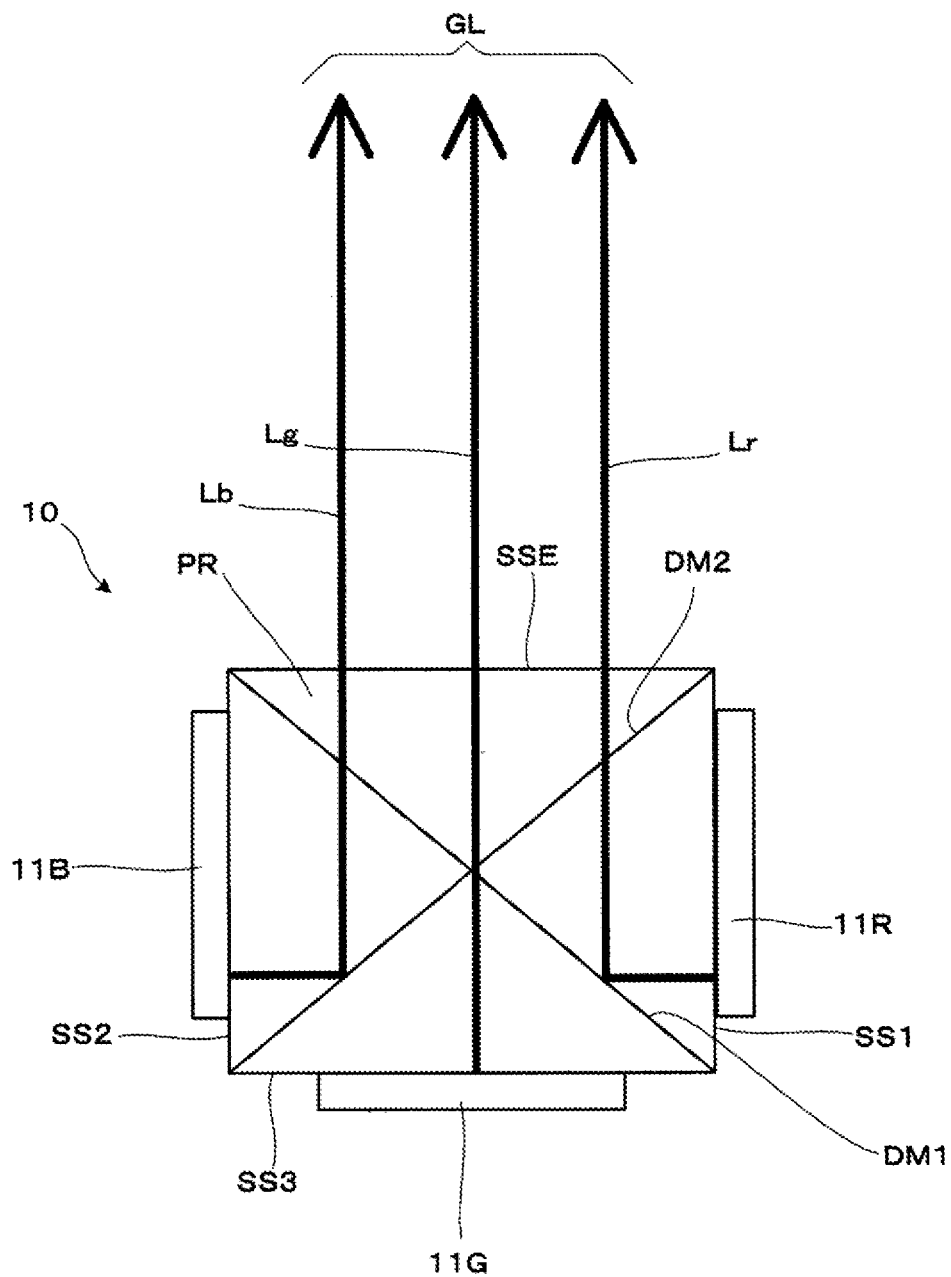
FIG. 3 is a conceptual plan view for describing the formation of synthesized light in the synthesis optical system.

Next, with reference to FIG. 3, the light path of each color light in the image formation unit 10 will be described, and at the same time, the synthesis of the color light, that is, the formation of the image light GL will be described. First of all, the red color light Lr emitted from the first image element 11R attached to the first side surface SS1 of the synthesis optical system PR is reflected on the first dichroic film DM1, and travels toward the light emitting surface SSE. Note that the red color light Lr penetrates the second dichroic film DM2.

On the other hand, the blue color light Lb emitted from the second image element 11B attached to the second side surface SS2 of the synthesis optical system PR is reflected on the second dichroic film DM2, and travels toward the light emitting surface SSE. Note that the blue color light Lb penetrates the first dichroic film DM1.

Finally, the green color light Lg emitted from the third image element 11G attached to the third side surface SS3 of the synthesis optical system PR penetrates both the first and the second dichroic films DM1 and DM2, and travels toward the light emitting surface SSE.

As described above, each transmitted and reflected color light Lr, Lb, and Lg is synthesized, and is emitted from the light emitting surface SSE as the image light GL.

Coming back to FIG. 1, in the virtual-image display apparatus 100, the display optical system 2 has a projection optical system 12 and a light-guiding optical system 20. Note that in the illustration, the image light GL passing over the light axis AX of the projection optical system 12 is described.

The projection optical system 12 is conceptually and abstractly illustrated in FIG. 1, but is actually constituted by a single lens or a plurality of lens groups, and projects the image light GL that passes through the image formation unit 10, that is, the image light GL that passes through the synthesis optical system PR toward the light-guiding optical system 20. Note that in an example described later with reference to FIG. 4, the projection optical system 12 is illustrated as one constituted by three lenses L1 to L3.

The light-guiding optical system 20 is a light-guiding member or a light-guiding apparatus configured to guide the image light GL from the projection optical system 12 to in front of the eyes of an observer by internally reflecting as well as emitting the image light GL.

Next, a specific configuration as well as an example of the light path of the virtual-image display apparatus 100 according to the present embodiment will be described with reference to FIG. 4.

Figure 4:
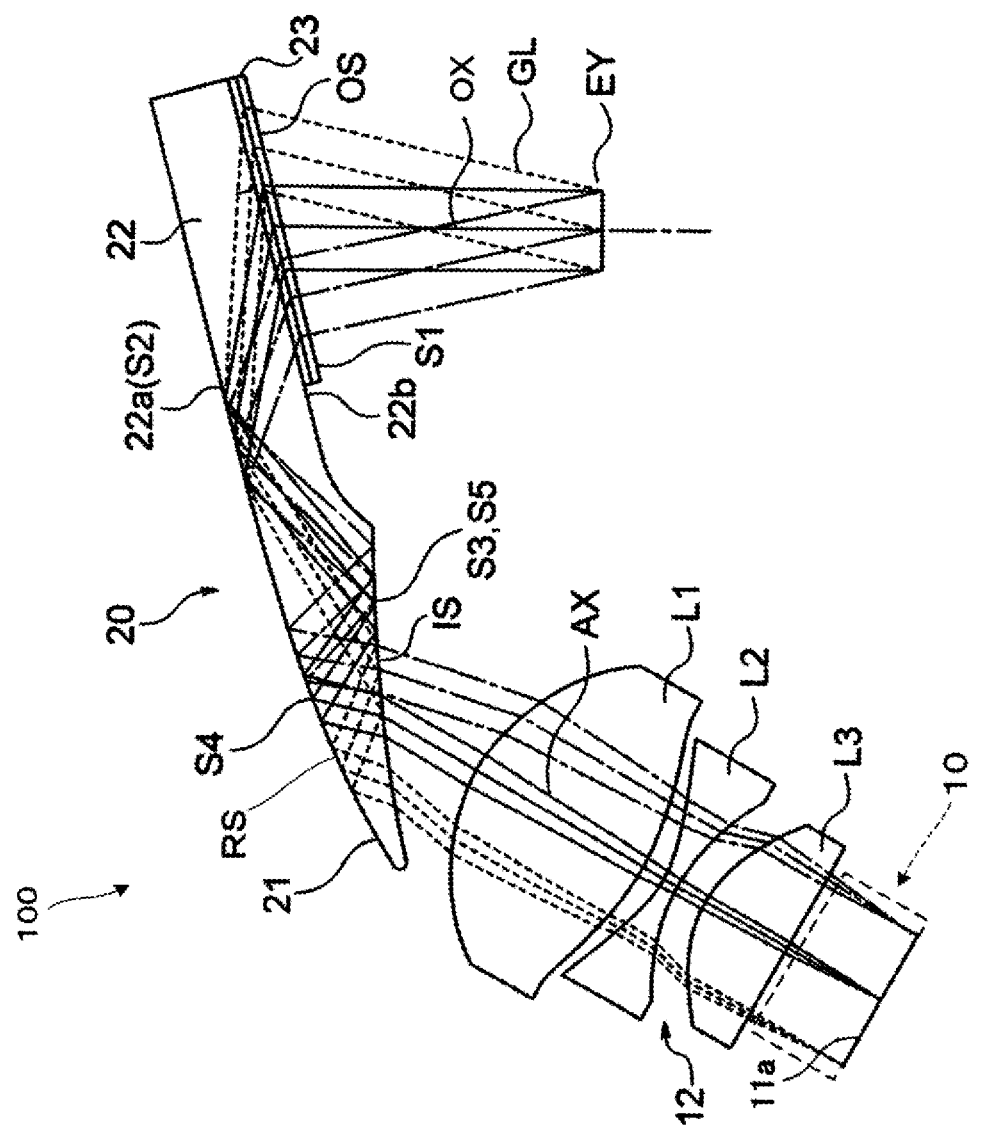
FIG. 4 is a plan view for describing an example of a configuration of the virtual-image display apparatus and the light path.

In the example illustrated in FIG. 4, the projection optical system 12 is constituted by the three lenses L1 to L3. Further, the light-guiding optical system 20 includes an incidence part 21 configured to let in the image light, a parallel light guide 22 for guiding the light, and an emitting part 23 for letting out the image light.

The incidence part 21 is arranged at the ear side of the observer, and the emitting part 23 is arranged at the nose side of the observer. The main bodies of the parallel light guide 22 and the incidence part 21 are molded into an integrated part or a single member by a resin material having high light transmissivity. Note that the parallel light guide 22 is tilted and arranged with respect to the light axis OX set with reference to the eyes EY of observer. In this case, the parallel light guide 22 can be arranged along a curved line of the face.

The incidence part 21 has a light incidence surface IS configured to let in the image light GL from the projection optical system 12, and a reflection surface RS that reflects the image light GL that has been let in and guides the image light inside the parallel light guide 22. The light incidence surface IS is formed by a convex curved surface at the projection optical system 12 side, and also has a function of totally reflecting, on the inner surface side, the image light GL reflected by the reflection surface RS. The reflection surface RS is formed by a convex curved surface at the projection optical system 12 side. The reflection surface RS is formed by performing film formation, such as aluminum evaporation on the curved surface, and configured to reflect the image light GL entering from the light incidence surface IS to bend the light path in a predetermined direction. The light incidence surface IS, at the inside, totally reflects the image light GL reflected by the reflection surface RS to bend the light path in a predetermined direction. Note that the curved surface forming each surface is a non-axisymmetric free curved surface, but is not limited thereto, and can be an axisymmetric free surface, a spherical surface, a non-spherical surface, or the like. Further, each curved surface can assist the collimation function by the projection optical system 12.

The parallel light guide 22 is a flat sheet portion, and has two planes 22a and 22b facing each other that form a pair of surfaces extending in parallel. Since both planes 22a and 22b are parallel planes, the external image is not magnified and a focus is not shifted. In the parallel light guide 22, one plane 22a functions as a total reflection surface that totally reflects the image light from the incidence part 21, and has a role of guiding, to the emitting part 23, the image light with a minimum loss. The plane 22b on the back side forms the boundary surface between the parallel light guide 22 and the emitting part 23.

The emitting part 23 is a member that is formed in layers on an extension along the plane 22b at the back side, in a far side of the parallel light guide 22, that is, at the nose side of the observer, and has a reflection unit formed by arranging a plurality of mirrors having transmissivity. As a result, the emitting part 23, while allowing the passage of the image light GL that is totally reflected in the plane 22a on the outer side forming the total reflection surface of the parallel light guide 22, reflects the incident image light GL at a predetermined angle to bend the incident image light to the light emitting surface OS side.

Note that each optical surface of the light-guiding optical system 20 on the light path is set as described below, sequentially from the downstream of the light path. First of all, the plane 22b of the parallel light guide 22 or the light emitting surface OS is set as a first surface S1, and the plane 22a is set as a second surface S2. Next, the light incidence surface IS of the incidence part 21 is set as a third surface S3 when viewed as a reflection surface through total reflection. In addition, the reflection surface RS of the incidence part 21 is set as a fourth surface S4. Finally, the light incidence surface IS is set as a fifth surface S5 when viewed as a surface that lets in light.

Next, an operation of the virtual-image display apparatus 100 illustrated in FIG. 4 along the light path of the image light GL will be described in brief. Note that in the figure, the light emitting surface 11a virtually illustrates the emission position of the image light GL synthesized in the image formation unit 10, and corresponds to the light emitting surface of the third image element 11G (see FIG. 3 and other figures).

First of all, the image light GL emitted from the light emitting surface 11a of the image formation unit 10 is emitted toward the light-guiding optical system 20 after passing through the projection optical system 12 constituted by the three lenses L1 to L3. The image light GL, upon entering from the fifth surface S5 of the light-guiding optical system 20, is reflected by the fourth surface S4, and in addition, upon being totally reflected on each of the third surface S3 and the second surface S2, reaches the first surface S1, and is emitted toward the eyes EY of the observer while being bent. That is, the image light GL reaches up to the eyes EY of the observer by being guided by the light-guiding optical system 20. When reaching the position of the eyes EY, each component of the image light GL is a parallelized bundle of rays, and enters by superpositioning at the position of the eyes EY. The observer identifies the image position by means of the incident direction or incident angle of light, and visually recognizes the virtual image. In this case, the cross-sectional shape of each bundle of rays superpositioned at the position of the eyes EY becomes the eye ring shape, and the diameter becomes the eye ring diameter.

Note that in the case of the above configuration, by providing a free curved surface on a part of the first surface S1 to the fifth surface S5, the load on the projection optical system 12 can be reduced, and as a result the optical system can be made thinner. Further, during the optical design, by following the light path in an order that is the reverse of the above, that is, in an order starting from the first surface S1 with the position of the eyes EY as the first reference, the settings of each part are made.

As a result of the configuration described above, the image light GL that is synthesized in the synthesis optical system PR constituting the image formation unit 10 is guided to the front side of the eyes of the observer without fail.

Figure 5:
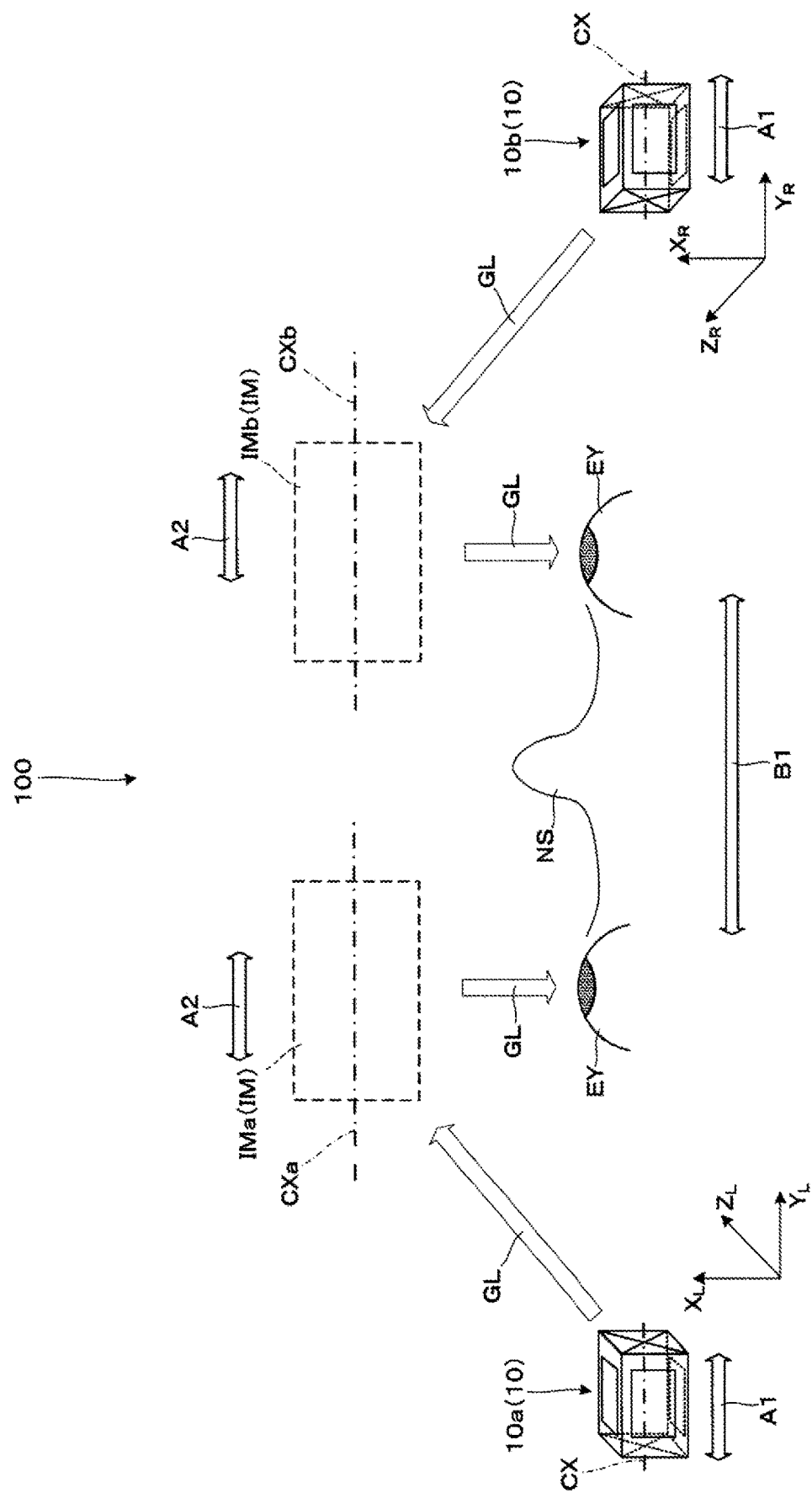
FIG. 5 is a conceptual diagram for describing a relationship between the intersecting axis of the synthesis optical system and the alignment of the eyes of the observer.

Here, in a case when the state before the image light GL is guided by each optical system, as described above, and the state after the image light GL is guided by each optical system are compared, the direction in which the cross axis CX (see FIG. 2) extends, that is, the axial direction of the cross axis CX that can be used as a reference when the direction of transmission and reflection during synthesis in the image formation unit 10 is taken into consideration corresponds to the horizontal direction for the observer, that is, the direction of alignment of the left and right eyes of the observer. FIG. 5 is a conceptual diagram for describing a relationship between the cross axis CX that is the intersecting axis of the synthesis optical system PR and the alignment of the eyes EY of the observer. Note that in FIG. 5, the virtual-image display apparatus 100 has a left-right pair configuration.

As illustrated in the figure, in each of the left-right pair of image formation units 10a and 10b, the cross axes CX and CX that are the intersecting axes of the synthesis surface in the synthesis optical systems PR and PR correspond to the virtual axes CXa and CXb extending in the horizontal direction, that is, the lateral direction on the virtual-image screens IMa and IMb visually recognized by the observer. Therefore, the direction A1 in which the cross axis CX extends corresponds to the direction A2 in which each virtual axis CXa and CXb extends, and the direction A2 in which each virtual axis CXa and CXb extends corresponds to the direction B1 in which the left and right eyes EY and EY are aligned across the nose NS of the observer. That is, the direction A1 is a direction along the direction B1. As a result of such a relationship, in the present embodiment, an appropriate eye ring diameter is formed to reduce loss of the virtual image in terms of visual recognition, and the compactness of each optical system, and consequently, the compactness of the apparatus can be achieved. Note that as illustrated in the figure, the direction in which the cross axis CX extends in the image formation unit 10a corresponding to the left eye EY is the $Y_L$ direction, and the emission direction of image light is the $Z_L$ direction. Note that the direction perpendicular to the $Y_L$ direction and the $Z_L$ direction for a right-handed system with respect to the $Y_L$ direction and the $Z_L$ direction specified as above is the XL direction. Similarly, the direction in which the cross axis CX extends in the image formation unit 10b corresponding to the right eye EY is the $Y_R$ direction, and the $Z_R$ direction and $X_R$ direction can be specified.

Figure 6:
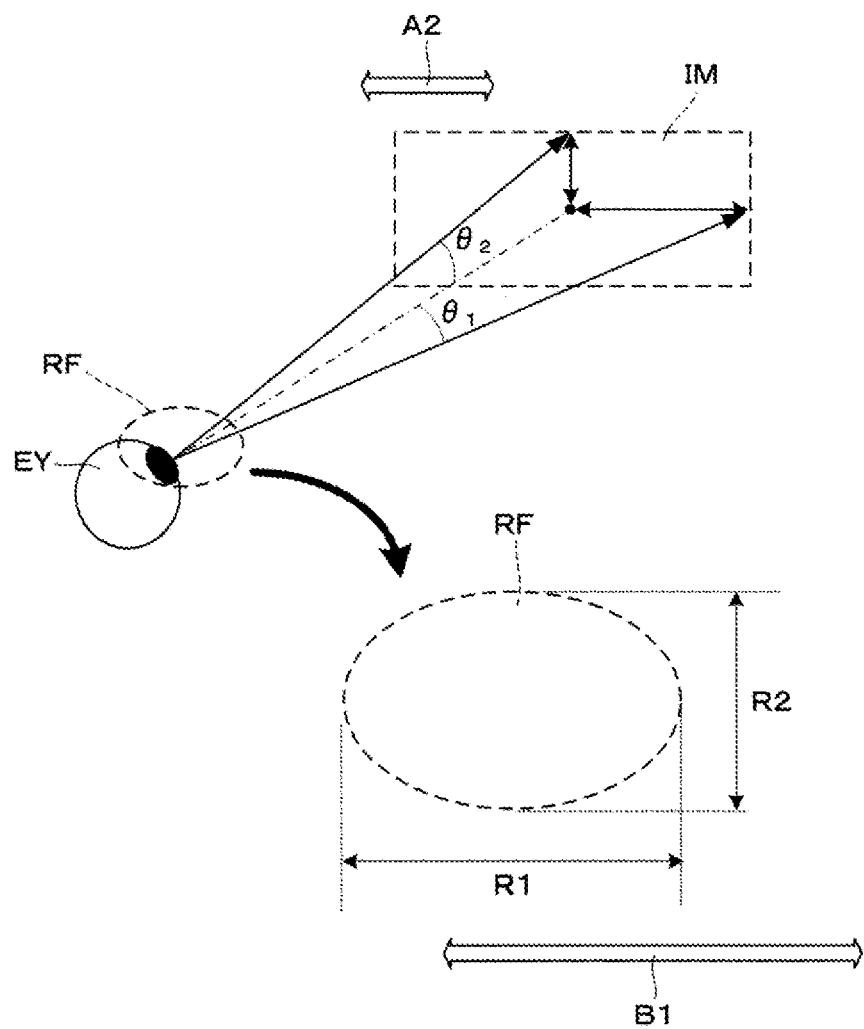
FIG. 6 is a conceptual perspective view for describing an eye ring diameter.

Next, the eye ring diameter formed by the optical system in the present embodiment will be described with reference to FIG. 6. FIG. 6 conceptually illustrates an example of the eye ring shape that is formed. Particularly, in the present embodiment, as illustrated through partial magnification in FIG. 6, the eye ring shape RF at the position of the eyes EY has a shape in which the direction of alignment of the eyes of the observer is the long axis direction. That is, as for the eye ring diameter of the eye ring shape RF, the diameter R1 in the direction of alignment of the eyes EY is larger than the diameter R2 in the perpendicular direction. Here, as an example, the eye ring shape RF is elliptical with the direction of alignment of the eyes as the long axis direction, that is the eye ring shape RF is an elliptical shape which is longer in the lateral direction.

Generally, human eyes have a broader visual field in the lateral direction than the vertical direction. Therefore, during image display too, as described above, for example, a horizontally long rectangular shape is formed in most cases. That is, as illustrated in FIG. 6, the virtual screen IM is horizontally long, and the angle of view $\theta_1$ in the lateral direction is desired to be larger than the angle of view $\theta_2$ in the vertical direction. In addition, essentially, human eyes move often to the left and right, and the alignment of the left and right eyes varies from one individual to another. As a result of the reason described above, in order to ensure that images are not missed, that is, to enable light to reach the eyes, it is important to particularly increase the eye ring diameter of the image light in the lateral direction that is the direction of alignment of the eyes. From a different viewpoint, in the vertical direction that is the direction perpendicular to the direction of alignment of the eyes, the eye ring diameter is not as necessary as in the lateral direction. In FIG. 6, in a case where the ratio of diameter R2 to diameter R1 that correspond to the short side and the long side of the eye ring shape RF is set to approximately 1:2, for example, there is no loss of the horizontally long image, and the variation in the pupil distance can also be handled. Moreover, by setting the eye ring shape RF to an elliptical shape, the size of each part of the mirror and other components that deflect the image in the direction of the eyes EY can be reduced.

Figure 7A:
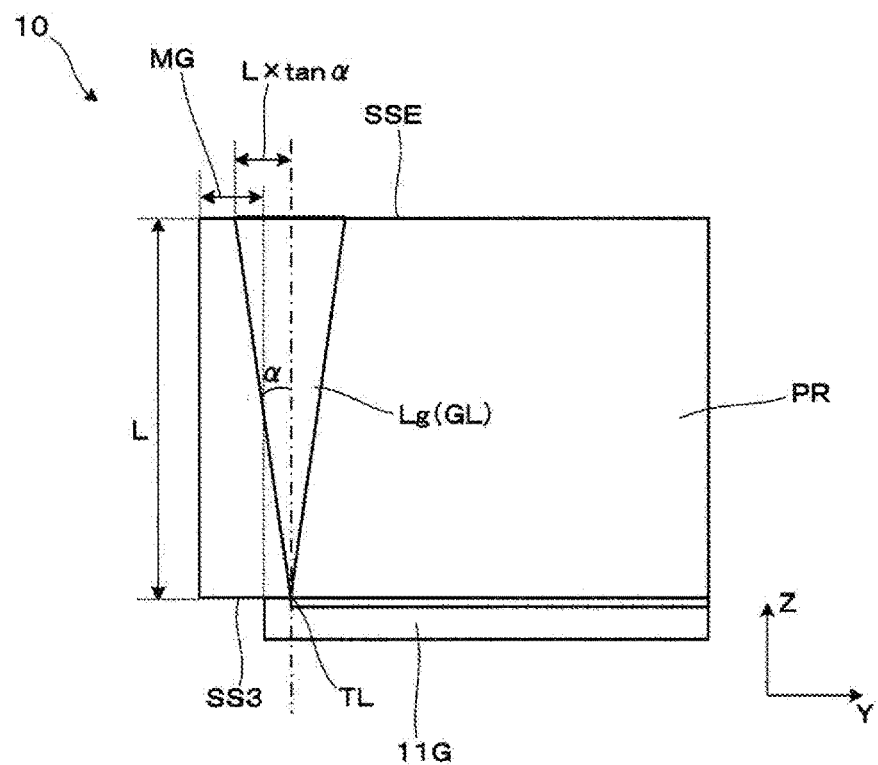
FIG. 7A is a conceptual diagram illustrating a magnified part for describing a divergence angle depicting the spread of the image light.
Figure 7B:
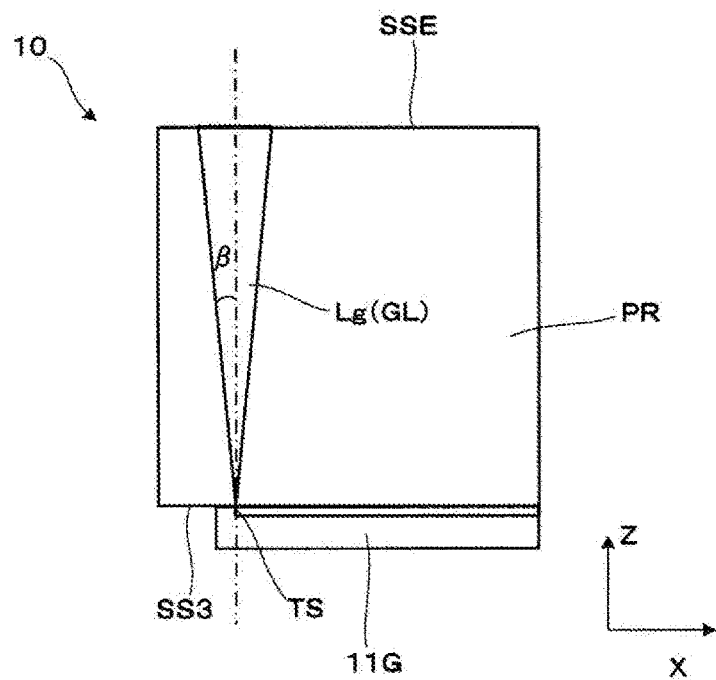
FIG. 7B is a conceptual diagram illustrating a magnified part for describing a divergence angle depicting the spread of the image light.

Thus, in the present embodiment, as illustrated in FIG. 7A and FIG. 7B, the divergence angle in each image element 11R, 11B, 11G that is the light emitting side is adjusted along the direction corresponding to the direction of the eye ring diameter described above. In addition, for example, in the display optical system 2, by guiding the image light while maintaining the relationship of the divergence angle at the light emitting side, it is possible to form an elliptical-shaped eye ring as illustrated in FIG. 6.

Next, a divergence angle depicting the spread of the image light will be described with reference to FIG. 7A and FIG. 7B. Note that FIG. 7A and FIG. 7B illustrate a magnified part of the third image element 11G among each image element 11R, 11B, and 11G, and FIG. 7A conceptually illustrates the condition of the green color light Lg to form the image light GL emitted from a panel end TL at the long side of the third image element 11G attached to the side surface SS3 of the synthesis optical system PR, and the divergence angle α of the green color light Lg. That is, as illustrated in the figure, the Y direction is the long-side direction of the rectangular third image element 11G, which is the Y direction parallel to the direction in which the cross axis CX (see FIG. 2 and other figures) extends, that is the axial direction.

On the other hand, FIG. 7B conceptually illustrates the condition of the green color light Lg emitted from a panel end TS at the short side of the third image element 11G, and the divergence angle β of the green color light Lg. That is, as illustrated in the figure, the X direction is the short-side direction of the rectangular third image element 11G, which is the X direction perpendicular to the direction in which the cross axis CX (see FIG. 2 and other figures) extends, that is the axial direction.

In the case described above, the divergence angle α is larger than the divergence angle β. As a result of using image light having such features of the divergence angle, for example, it is possible to form an elliptical-shaped eye ring as illustrated in FIG. 6. Here, as an example, the divergence angle α may be either 10 degrees or around 10 degrees, and the divergence angle β may be either 7 degrees or around 7 degrees. Based on the viewpoint that the image does not tend to get lost as a result of having a spread such as that described above, it is possible to form image light GL that forms a bundle of rays in the desired shape, and consequently, form a virtual image that forms the desired eye ring diameter.

Note that by taking into consideration the component that is emitted from the panel end TL at the long side at a divergence angle α as illustrated in FIG. 7A, the size of the synthesis optical system PR is determined. That is, as illustrated in the figure, it is necessary to provide a sufficient margin MG in the Y direction, that is, in the lateral direction, so that the component that is emitted from the panel end TL at the divergence angle α is included in the light emitting surface SSE. That is, as illustrated in the figure, in a case where the length of one side of the synthesis optical system PR in the Z direction that is the light emitting direction is set as length L, the width of the spread of the bundle of rays on the light emitting surface SSE will be L×tan α. Therefore, it is necessary to secure margin MG so as to be provided in L×tan α or more in the Y direction from the position of the panel end TL. In the present embodiment, as is clear with reference to FIG. 2B, the Z direction is the short-side direction of the two image elements 11R and 11B other than the third image element 11G. Therefore, length L can be reduced as compared to the case of the comparative example described later (see FIG. 10). Therefore, the value of L×tan α described above, that is, the size of the margin MG can be minimized, and consequently, the size of the synthesis optical system PR can be reduced.

Here, in a case where a divergence angle such as that described above is included, the reflection characteristics of the first and the second dichroic films DM1 and DM2 also need to be taken into consideration for the two image elements 11R and 11B other than the third image element 11G. The reflection characteristics of each dichroic film DM1 and DM2 are fabricated to show the highest appropriateness with respect to the set incident angle of light. As illustrated in the figure, since each dichroic film DM1 and DM2 is inclined at an angle of 45° with respect to the two image elements 11R and 11B, each film performs color separation at a high accuracy by efficiently reflecting the components of the wavelength band corresponding to the component that is incident at 45°, and at the same time, transmitting the components of the other wavelength bands, and thus, high-performance color synthesis can be performed by the overall synthesis optical system PR. Therefore, for a component that is incident at an incident angle far away from 45°, it may not be possible to maintain a sufficiently high reflectivity that is enough to visually recognize favorable images. That is, problems related to color separation or color synthesis may occur in components for which the incident angle on each dichroic film DM1 and DM2 is a far different value than 45°, from among the components that are incident from the two image elements 11R and 11B.

Figure 8:
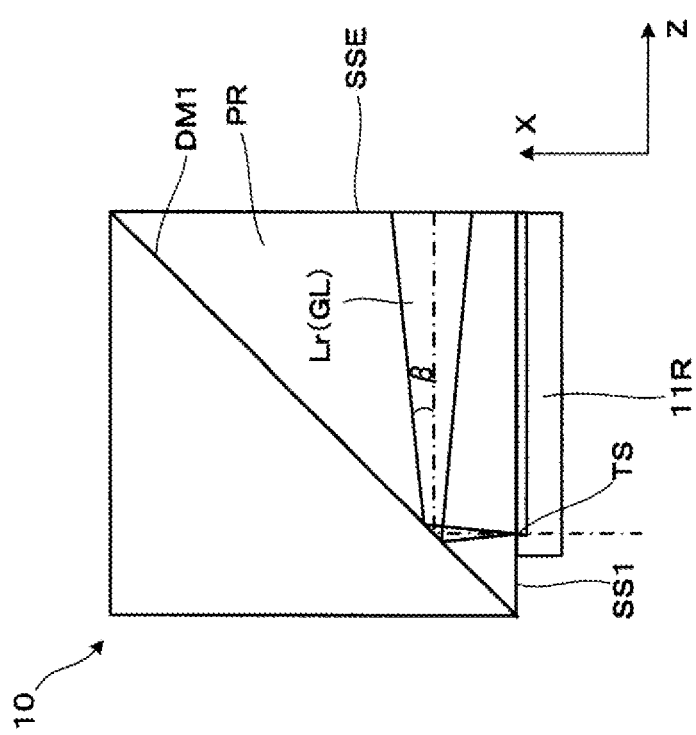
FIG. 8 is a conceptual diagram for describing an incident angle on a reflection surface of the image light.

FIG. 8 corresponds to FIG. 7B, and conceptually illustrates the condition of the red color light Lr to form the image light GL emitted from a panel end TS at the short side of the first image element 11R, and the divergence angle β of the red color light Lr. Note that even with regard to the second image element 11B, the relationship with the second dichroic film DM2 is same as that described below, and therefore, the illustration and description thereof is omitted.

In the case of the figure, the red color light Lr is incident on the first dichroic film DM1 that is inclined at 45°, but the difference in the divergence angle β directly affects the difference in the incident angle. That is, the incident angle of light has a range of 45°±β. On the other hand, although not illustrated in the figure, the divergence angle α is the spread in the Y direction that is the direction along the cross axis CX, and therefore, regarding the reflection on the first dichroic film DM1, there is no impact that is as large as that shown in FIG. 8. In the present embodiment, the value of the divergence angle β is smaller than that of the divergence angle α, and specifically speaking, is restricted to around 7°. As a result, the reflectivity rapidly decreases due to the reflection characteristics of the first dichroic film DM1, due to which events such as uneven color in the image and a difference in contrast, as well as loss of images can be avoided.

Figure 9:
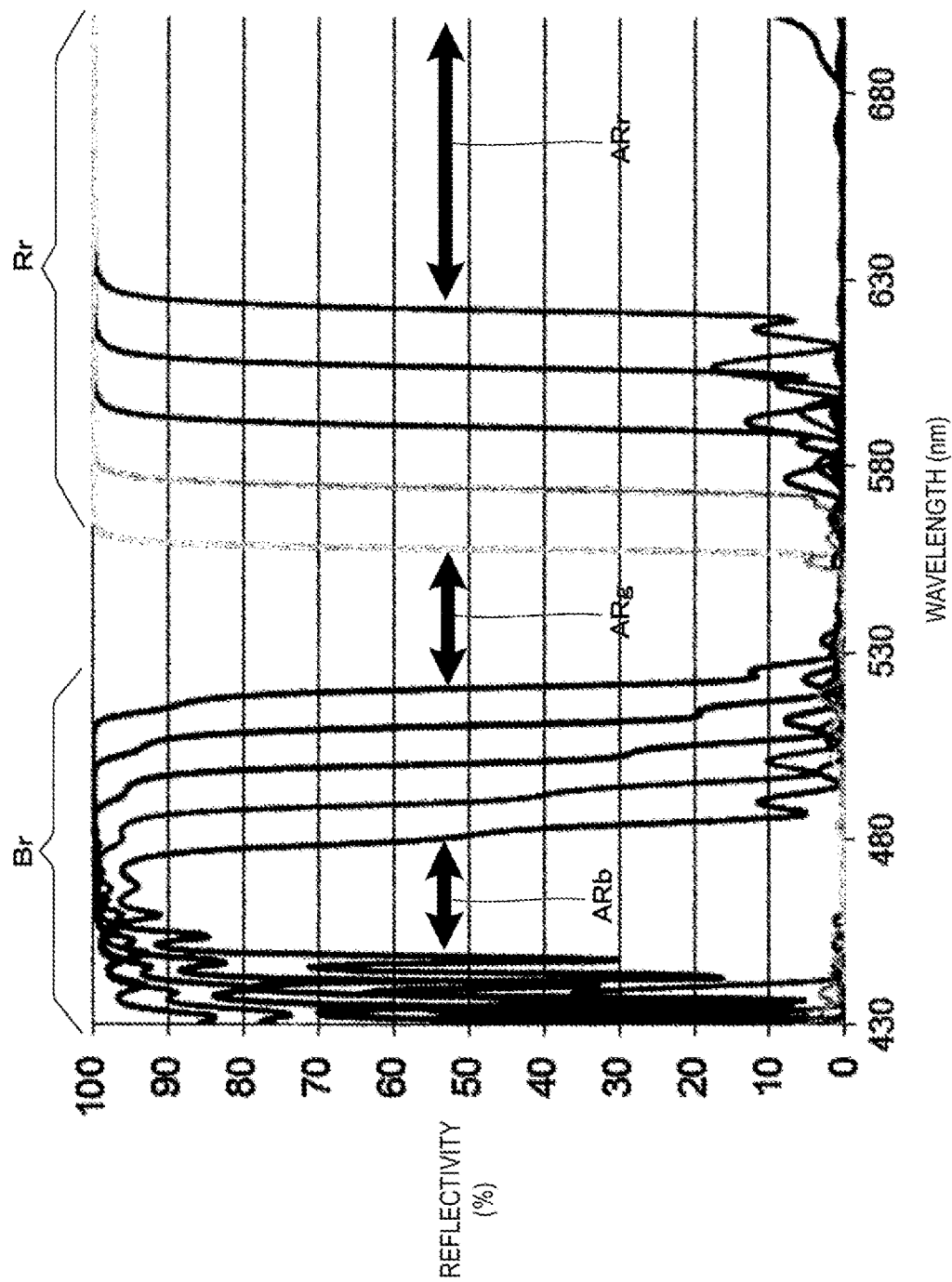
FIG. 9 is a graph illustrating an example of the reflection characteristics of each wavelength on the reflection surface.

FIG. 9 is a graph illustrating an example of the reflection characteristics of each wavelength in the first and the second dichroic films DM1 and DM2 that are the reflection surfaces, and while the horizontal axis is the wavelength of the incident light (unit: nm), the vertical axis is the reflectivity of the incident light (unit: %). Each curved line shows general dichroic mirror characteristics used in the dichroic films, etc. constituting the cross dichroic prism for the projector, and also shows the reflection characteristics at the incident angle of light. In such a case, for example, a change in the reflection characteristics at the side with a larger wavelength affects the reflection of the red color light Lr, and a change in the reflection characteristics at the side with a smaller wavelength affects the reflection of the blue color light Lb. Further, the incident angle ranges from 45°−8°=37° to 45°+8°=53° in view of the range of the change in the angle due to the effect of the divergence angle, and is displayed by selecting several typical values. Specifically, in FIG. 9, for example, the group of curved lines Rr in which the reflectivity changes at the side with a larger wavelength shows the reflection and transmission characteristics of the first dichroic film DM1, and includes five curved lines that indicate the reflection characteristics at incident angles of 37°, 41°, 45°, 49°, and 53°. On the other hand, the group of curved lines Br in which the reflectivity changes at the side with a smaller wavelength shows the reflection and transmission characteristics of the second dichroic film DM2, and includes five curved lines that indicate the reflection characteristics at incident angles of 37°, 41°, 45°, 49°, and 53°.

Here, as is clear from the graph, the reflection characteristics have a large wavelength dependence depending on the incident angle, and as the range of the angle increases, the performance of color separation worsens. On the other hand, a case is assumed where during the formation of image light, a high reflectivity of 90% or higher, and preferably 95% or higher is maintained for the red color and blue color wavelength bands, while a high transmissivity is desired to be maintained for the green color wavelength band by setting the reflectivity to 10%, and preferably to 5% or less. In a case where an attempt is made to secure a wavelength range for thus satisfying the conditions of high color separation, for example, the situation would be such that the let-out range of blue color light due to reflection will be the arrow ARb, the let-out range of green color light due to transmission will be the arrow ARg, and the let-out range of red color light due to reflection will be the arrow ARr. That is, it is understood from the graph that unless the range of the incident angle is restricted, or the wavelength band used is narrowed, it may not be possible to perform appropriate color separation.

In contrast, in the present embodiment, while the divergence angle in the direction along the cross axis CX in which the width of the incident angle is not easily affected as described above is set comparatively larger at approximately 10° for example, the divergence angle in the direction perpendicular to the cross axis CX in which the divergence angle greatly influences the incident angle is comparatively minimized at 7° for example. By minimizing the divergence angle in the direction perpendicular to the cross axis CX, the image formation unit 10 can maintain a large wavelength band that can be used, that is, a large wavelength band that can be allowed while maintaining high reflection and transmission characteristics. That is, by specifying the divergence angle and the wavelength bandwidth of the color lights Lr, Lb, and Lg described below in accordance with the reflection characteristics in the first and the second dichroic films DM1 and DM2, a favorable image formation is secured.

Note that in addition to the divergence angle concerning the direction along the cross axis CX, and the divergence angle concerning the direction perpendicular to the cross axis CX as described above, it is necessary to take into consideration the components of light proceeding in an inclined direction including both the components. However, the inclination of the components with respect to the first and the second dichroic films DM1 and DM2 does not vary greatly from the inclination in the direction perpendicular to the cross axis CX. For example, it is understood from the calculations that the incident angle with respect to the first dichroic film DM1 or the second dichroic film DM2 is 45°+7°=52° in the X direction that is the direction perpendicular to the cross axis CX, and even in the case of a component emitted in a direction such that the divergence angle in the Y direction that is the axial direction of the cross axis CX is 10°, the effective incident angle is 52.677°. That is, even in such an inclined direction, the effective angle does not increase so much as compared to the inclination in the direction perpendicular to the cross axis CX. This is because while the angle of divergence in the X-direction is either as is added to or subtracted from the reference 45°, the angle of divergence in the Y direction that is parallel to the cross axis CX has almost no effect on the incident angle. Therefore, in consideration of the range of the divergence angle in the X direction that is the direction perpendicular to the cross axis CX, for example, by providing a slight margin hereto, a synthesized film having the desired transmission and reflection characteristics can be formed in the synthesis optical system PR.

Figure 10:
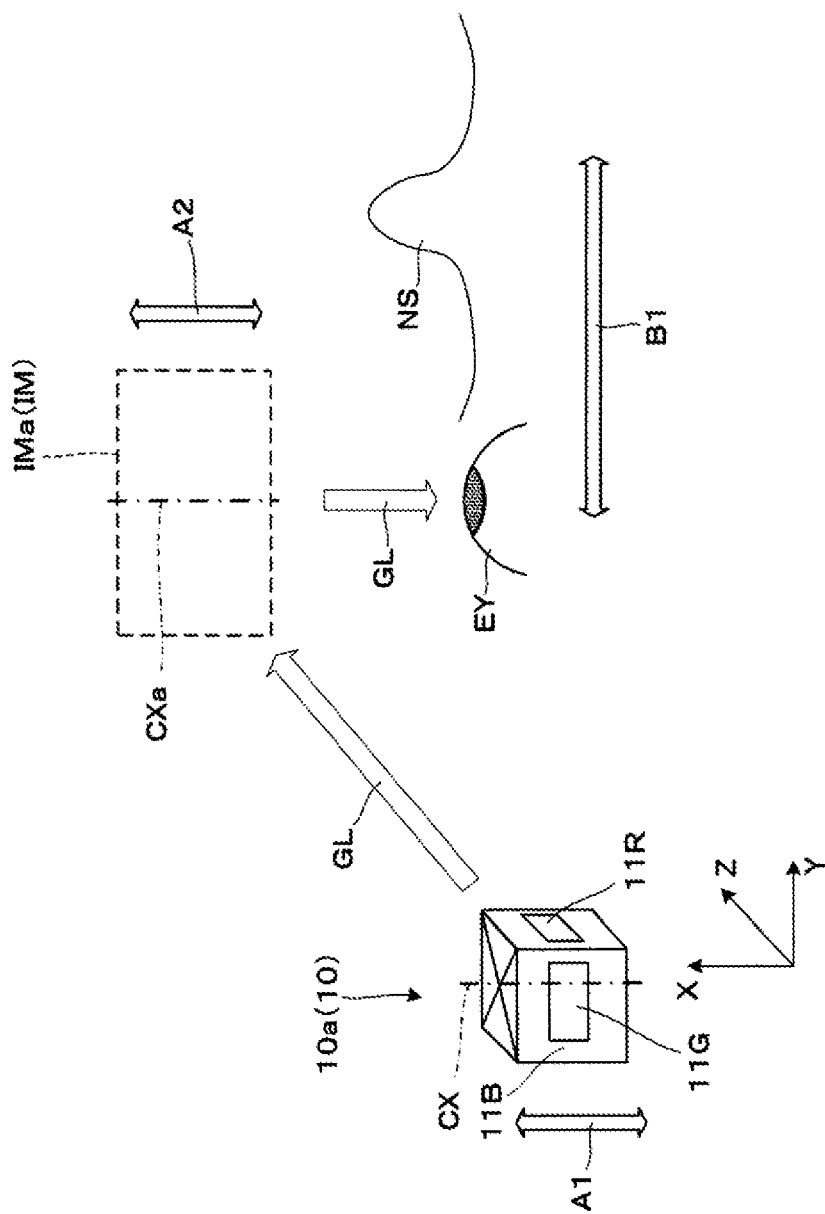
FIG. 10 is a conceptual diagram for describing a comparative example.

Next, a comparative example of the present embodiment will be described with reference to FIG. 10. FIG. 10 is a conceptual diagram for describing a comparative example, and corresponds to a part of FIG. 5. In the comparative example, as illustrated in the figure, unlike the present embodiment, in the image formation unit 10, the direction A1 in which the cross axis CX extends is not a direction along the direction B1 of alignment of the eyes EY, but is a direction perpendicular to the direction B1. In this case, for example, since the depth direction (Z direction) of the image formation unit 10 is the long-side direction for the first and the second image elements 11R and 11B, it is necessary to increase the size in this direction, which means that the optical system needs to be increased in size. In addition, this is disadvantageous even from the viewpoint of the margin MG taken into consideration with reference to FIG. 7A. Further, in the case of the present comparative example, since the long-side direction of the first and the second image elements 11R and 11B extends in a direction perpendicular to the cross axis CX, in view of the items taken into consideration with reference to FIG. 8 and FIG. 9, the difference in the reflection angle as a result of the divergence angle during reflection of the synthesis optical system PR in the long-side direction tends to increase. Therefore, the possibility of worsening of reflection characteristics in the component in which the divergence angle increases becomes high, which is disadvantageous even in terms of securing the eye ring diameter. In contrast, in the present embodiment, it is possible to avoid the concerned situation, and thus reduce the size of the apparatus while forming a favorable image.

Figure 11:
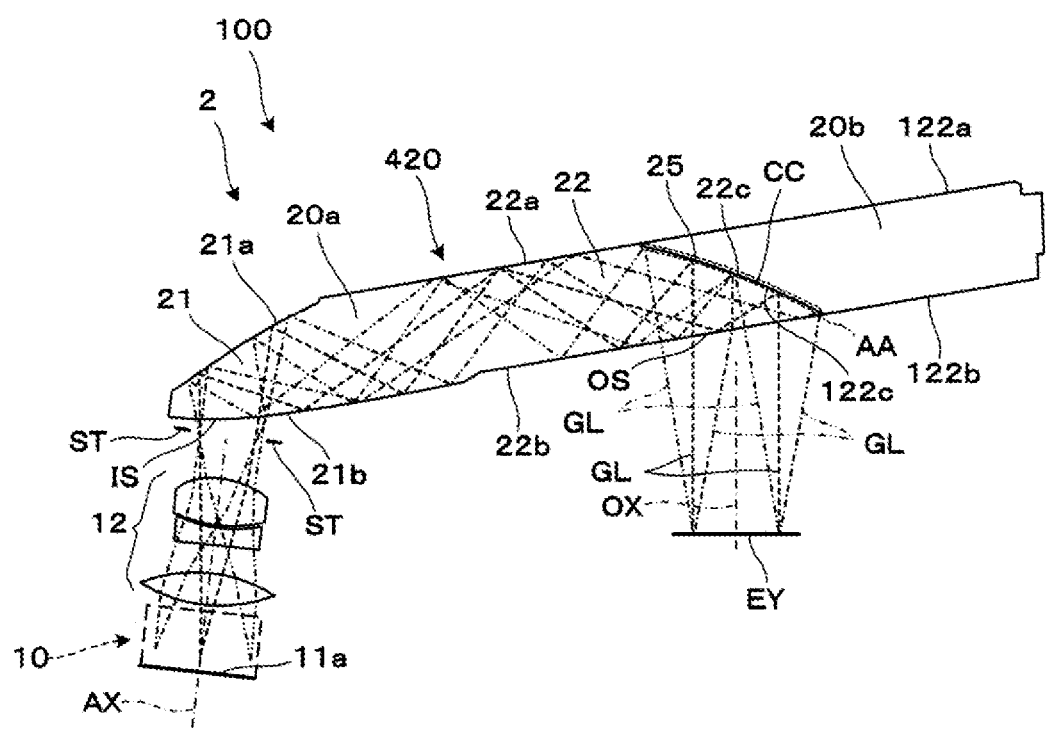
FIG. 11 is a plan view for describing a configuration and a light path of a virtual-image display apparatus according to a modified example.

Next, a modified example of the virtual-image display apparatus according to the present embodiment will be described with reference to FIG. 11. FIG. 11 is a plan view for describing a configuration and a light path of the virtual-image display apparatus a100 according to a modified example, and corresponds to FIG. 4.

As illustrated in the figure, the virtual-image display apparatus 100 according to the present modified example includes an image formation unit 10 and a display optical system 2 as a set, and the display optical system 2 has a projection optical system 12 and a light-guiding optical system 420. The image formation unit 10 has a configuration similar to the above-described configuration. Further, similarly to the projection optical system described above, the projection optical system 12 is constituted by three lenses L1 to L3. Moreover, the virtual-image display apparatus 100, as a light-guiding optical system 420, has a light-guiding member 20a for guiding the light and allowing see-through view, and a light-transmission member 20b for allowing see-through view. Among these, the light-guiding member 20a has an incidence part 21 and a parallel light guide 22, and the light-transmission member 20b is fixed on the parallel light guide 22.

The incidence part 21 of the light-guiding member 20a has a light incidence surface IS configured to let in the image light GL from the projection optical system 12, and a reflection surface RS that reflects the image light GL that has been let in and guides the image light inside the parallel light guide 22.

The parallel light guide 22 of the light-guiding member 20a has an optical surface 22c that is curved to the exposure side. A half mirror layer 25 is concomitantly provided on the surface of the optical surface 22c. The half mirror layer 25 is a reflection film having light transmissivity, that is, a semi-transmission reflection film that is formed by depositing a metallic reflection film or a dielectric multilayer film, and is provided with appropriate reflectivity with respect to the image light.

The light-transmission member 20b has planes 122a and 122b positioned in extended planes of a pair of planes 22a and 22b provided on the light-guiding member 20a, and also has an optical surface 122c between the planes 122a and 122b. The optical surface 122c is a curved surface that is joined to form one part with the optical surface 22c of the light-guiding member 20a.

In the light-guiding optical system 420, the light-guiding member 20a is joined to the light-transmission member 20b with an adhesive layer CC interposed therebetween, and, in an image let-out area AA in which the half mirror layer 25 is present, the adhesive layer CC is closer to the light-transmission member 20b as compared with the half mirror layer 25. The image let-out area AA is a region in which image light is emitted to the eyes of the user.

Next, an operation of the virtual-image display apparatus 100 illustrated in FIG. 11 along the light path of the image light GL will be described briefly. Note that in the figure, the light emitting surface 11a virtually illustrates the emission position of the image light GL synthesized in the image formation unit 10, and corresponds to the light emitting surface of the third image element 11G (see FIG. 3 and other figures).

First of all, the image light GL emitted from the light emitting surface 11a of the image formation unit 10 is emitted toward the light-guiding optical system 420 after passing through the projection optical system 12 constituted by the three lenses L1 to L3. The image light GL, upon entering from the curved surface 21b on which the light incidence surface IS of the light-guiding optical system 420 is formed, is reflected by the curved surface 21a on which the reflection surface RS is formed, and in addition, after being totally reflected on each of the curved surface 21b, the plane 22a, and the plane 22b, reaches the optical surface 22c, and some of the components reflected on the half mirror layer 25 are let out as the image light by which the image is to be visually recognized, and is emitted toward the eyes EY of the observer. That is, the image light GL reaches the eyes EY of the observer by being guided by the light-guiding optical system 420.

Even in the present modified example, the direction of alignment of the eyes and the direction of the cross axis have a similar corresponding relation as described above.

Further, in the case of a configuration such as that illustrated in the figure, for example, even if the divergence angle of the light from the image formation unit 10 constituted by image elements is equal in the direction of the cross axis and the direction perpendicular to the cross axis, by adjusting the range of the angle of letting in the light in the projection optical system 12 of the display optical system 2, the light is emitted toward the eyes EY of the observer so as to enable the divergence angle of light to become larger in the direction of the cross axis than the direction perpendicular to the cross axis.

Figure 12A:
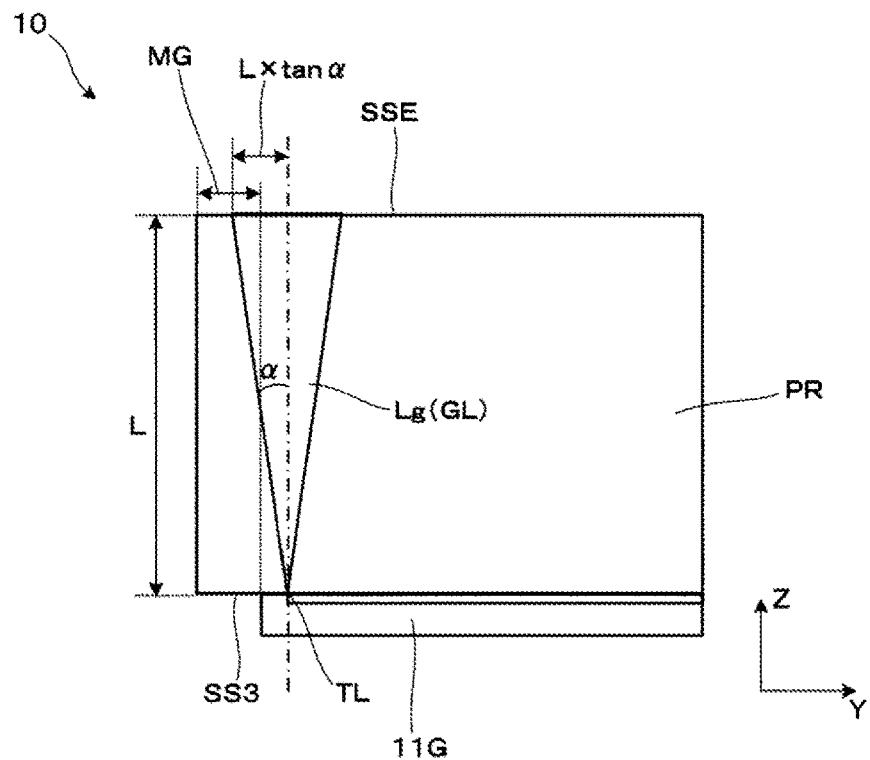
FIG. 12A is a conceptual diagram illustrating a magnified part for describing a modified example of a divergence angle depicting the spread of the image light.
Figure 12B:
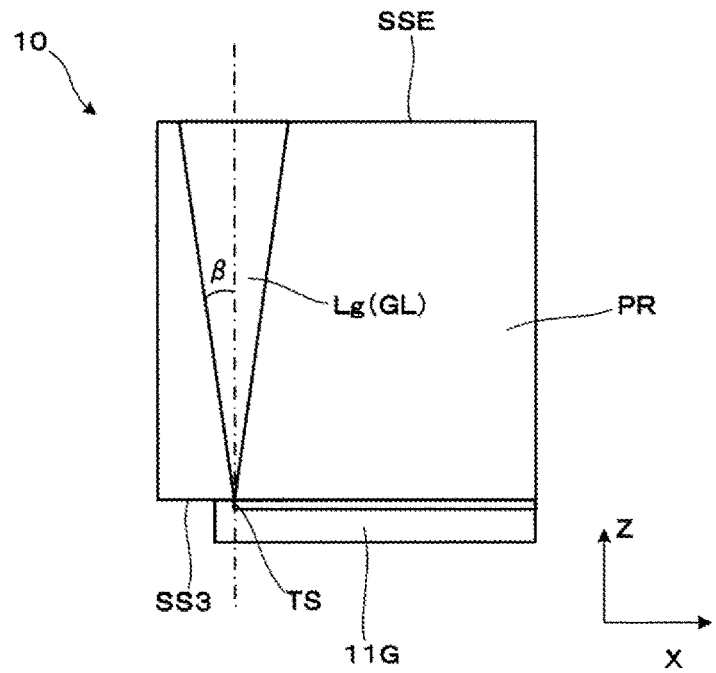
FIG. 12B is a conceptual diagram illustrating a magnified part for describing a modified example of a divergence angle depicting the spread of the image light.
Figure 13:
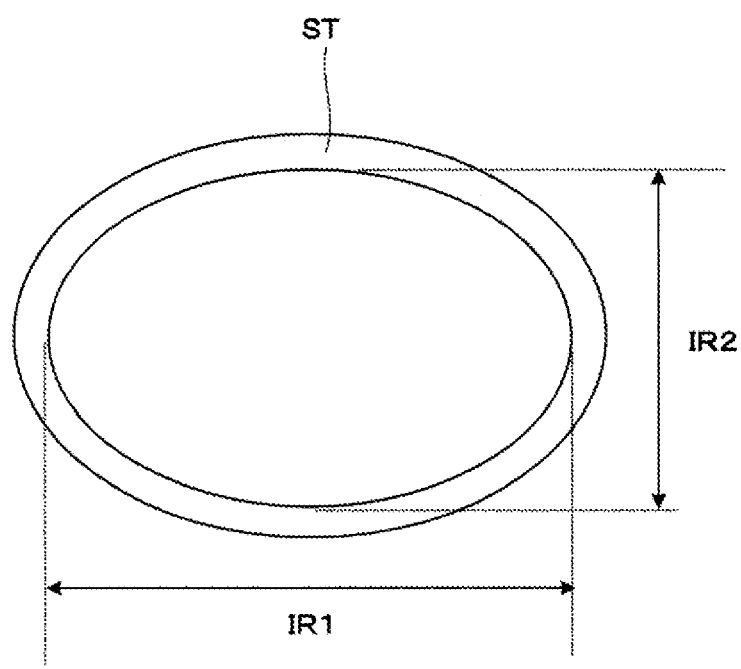
FIG. 13 is a conceptual front view illustrating an example of the shape of an aperture.

Next, a mode for enabling the above described will be explained. First of all, as a prerequisite, for example, as illustrated in FIG. 12A and FIG. 12B corresponding to FIG. 7A and FIG. 7B, the divergence angle in each image element 11R, 11B, 11G that is the light emitting side is equal along the direction corresponding to the direction of the eye ring diameter. That is, unlike the case illustrated in FIG. 7A and FIG. 7B, for example, the divergence angle α and the divergence angle β are equal, or almost equal without performing specific adjustments in each direction. In such a case, at a position of an aperture ST illustrated in FIG. 11, that is, at a position which is closer to the projection optical system 12 as compared with the position of the light incidence surface IS of the light-guiding optical system 420 and at which the principal light rays of the light emitted from the image formation unit 10 intersect, the shape of the aperture ST is a horizontally long elliptical shape such as that illustrated in FIG. 13, for example. That is, the inner diameter IR1 in a lateral direction corresponding to the direction of the cross axis is set to be larger than the inner diameter IR2 in a vertical direction corresponding to the direction perpendicular to the cross axis. As a result, the range of the angle of emitted light is adjusted, and it is possible to form an eye ring having an elliptical shape such as that illustrated in FIG. 6, for example. Note that the above configuration is an example, and in a case where a position other than the position in the example described above becomes the position where the principal light rays of the light emitted from the image elements intersect, then similar adjustments as those described above may be performed by providing an aperture at that position, for example.

As described above, in the virtual-image display apparatus 100 according to the present embodiment, while enabling the formation of a high-efficiency and high-definition image using the synthesis optical system PR, the direction A1 in which the cross axis CX that is the intersecting axis extends in the first dichroic film DM1 and the second dichroic film DM2 that are the synthesis surfaces in the synthesis optical system PR becomes correspondent with the direction B1 of alignment of the eyes EY of the observer. As a result, an appropriate eye ring diameter is formed to reduce loss of the virtual image in terms of visual recognition, and the compactness of each optical system, and consequently, the compactness of the apparatus can be achieved.

Others

The invention is described according to the above-mentioned exemplary embodiments, but the invention is not limited to the above-mentioned exemplary embodiments. The disclosure may be carried out in various modes without departing from the gist of the disclosure, and, for example, the following modifications may be carried out.

For example, the eye ring has a horizontally long elliptical shape, but the shape is not limited thereto, and various shapes in which the direction of alignment of the eyes of the observer is the long axis direction can be set.

Further, in the description above, in the display optical system 2, an elliptical-shaped eye ring was made possible by guiding the image light while maintaining the relationship of the angle of divergence at the light emission side, but the invention is not limited thereto, and it can be assumed that in the display optical system 2, for example, by adjusting the shape of the aperture provided at the focal point, the shape of the eye ring obtained in the end can be determined.

In the description above, the configuration is such that the virtual-image display apparatus 100 is provided as one set each corresponding to both the right eye and the left eye, but the virtual-image display apparatus 100 can be provided only for either one of the right eye and the left eye to view an image with one eye.

Further, in the description above, the specific descriptions are given assuming that the virtual-image display apparatus 100 according to the embodiment is a head-mounted display, but the virtual-image display apparatus 100 according to the embodiment is applicable to a head-up display, a binocular type handheld display, and the like.

In the description above, in the planes 22a and 22b of the parallel light guide 22, or the curved surface 21b, rather than providing a mirror or half mirror on the surface, the image light is guided by being totally reflected by an interface with respect to air, but the total reflection in the invention also includes the reflection achieved by the formation of a mirror coat or a half mirror film on the entire or a part of the planes 22a and 22b. For example, a case in which substantially the entire image light is reflected by forming a mirror coat, etc. on a part of the planes 22a and 22b and the incident angle of the image light GL is set so as to satisfy the total reflection conditions is also included.

It is not necessary to configure the incidence part 21 and the parallel light guide 22 constituting the light-guiding optical system 20 as an integrated unit, and the incidence part 21 and the parallel light guide 22 can be configured as separate parts, and both can be joined by an adhesive.

Further, in the description above, the parallel light guide 22 is horizontally long, and the light incidence surface IS is formed to be positioned at an outer side of the lateral direction of the eyes, but as long as the image light GL can be appropriately guided into the light-guiding optical system 20, the position of the light incidence surface IS is not limited thereto, and for example, can be provided in a part of the upper end surface or the lower end surface at the top or bottom of the light-guiding optical system 20.

Figure 14:
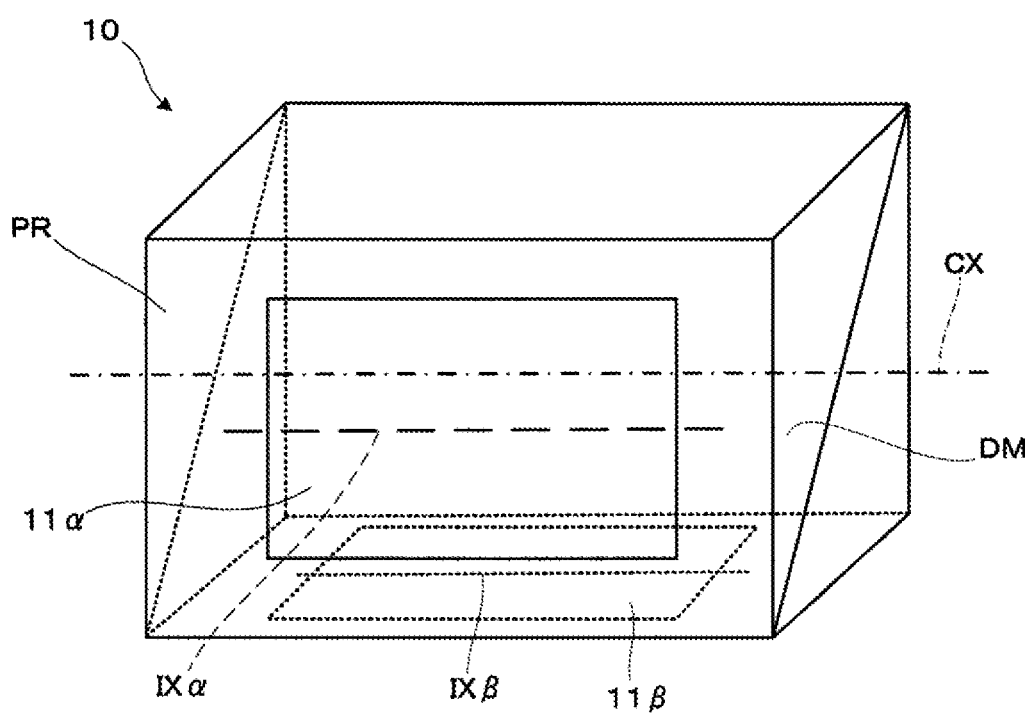
FIG. 14 is a conceptual perspective view for illustrating a modified example of an arrangement of the synthesis optical system and image elements.

Further, in the description above, a case in which color light of the three colors R, G, and B is synthesized by the three image elements 11R, 11B, and 11G in the image formation unit 10 is explained as an example, but in addition, for example, as illustrated in FIG. 14, a configuration in which light synthesis of color light is performed by two image elements 11α and 11β with one image element for B and one for R and G can also be considered. In this case, for example as illustrated in the figure, a straight line in the long-side direction that passes through the center position of the short-side direction in the image element 11α is set as the straight line IXα, and on the other hand, a straight line in the long-side direction that passes through the center position of the short-side direction in the image element 11β is set as the straight line IXβ. Based on this, the straight line IXα is moved in a direction perpendicular to the surface of the image element 11α, and the straight line IXβ is moved in a direction perpendicular to the surface of the image element 11β, and the straight line where the two intersect on the dichroic film DM that is a dichroic mirror is specified as the intersecting axis CX. With the intersecting axis CX specified as above as the reference, a study similar to the above case can be undertaken. Note that as for the combination of R, G, and B in the two image elements 11α and 11β, it is possible to have a combination of colors that is different from the example given above.

Figure 15:
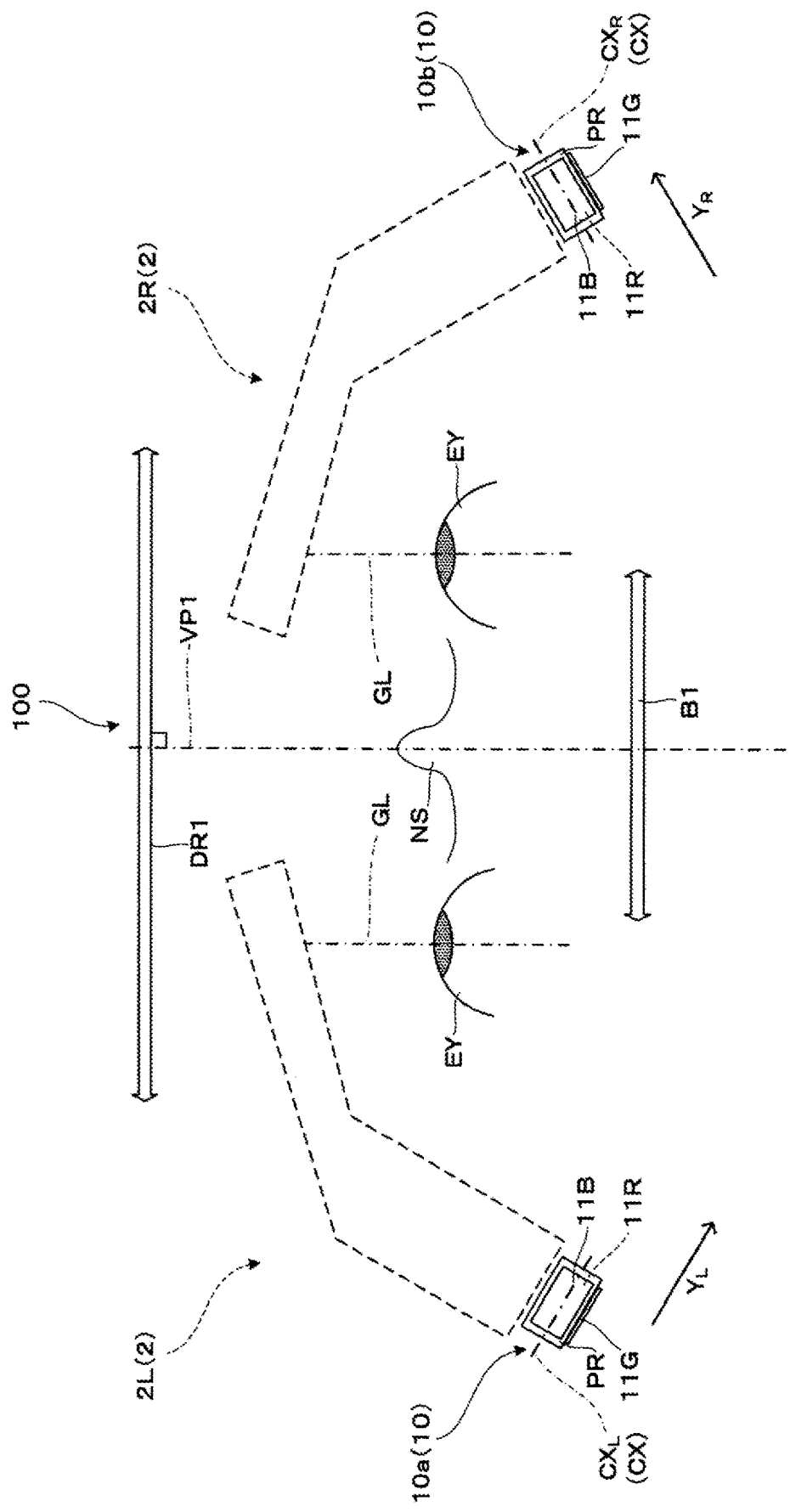
FIG. 15 is a conceptual plan view illustrating a virtual-image display apparatus with a left-right pair configuration.

Further, the configuration of the virtual-image display apparatus in the present embodiment can also be specified from the arrangement of a left-right pair of display optical systems. For example, as seen in the example of the conceptual plan view in FIG. 15, the virtual-image display apparatus 100 is a structure having a left-right pair of display optical systems 2L and 2R in addition to a left-right pair of image formation units 10a and 10b illustrated in FIG. 5. That is, the virtual-image display apparatus 100 has a display optical system 2L as a first display optical system, and a display optical system 2R as a second display optical system, and is configured to emit image light toward the eyes EY and EY of an observer that are aligned on the left and right from the display optical systems 2L and 2R. Here, the direction of alignment of the display optical system 2L and the display optical system 2R is the first direction DR1. Note that in a case where the observer is wearing the virtual-image display apparatus, as illustrated in the figure, the first direction DR1 corresponds to the direction B1 of alignment of the eyes EY of the observer as illustrated in FIG. 5 as well. In addition, one of the planes perpendicular to the first direction DR1 is, for example, a virtual plane VP1. On the other hand, in this case, in the virtual-image display apparatus 100, each image formation unit 10a and 10b is configured by mounting each of the image element 11R that is the first image element, the image element 11B that is the second image element, and the image element 11G that is the third image element on the synthesis optical system PR. Each synthesis optical system PR forms image light by synthesizing the light from each image element 11R, 11G, and 11B by the first synthesis surface and the second synthesis surface constituted by the first dichroic film DM1 and the second dichroic film DM2 illustrated in FIG. 2, etc. As a result, each of the image formation units 10a and 10b allows the corresponding image light to enter each of the corresponding display optical systems 2L and 2R. Note that here, as for the cross axis CX that is an intersecting axis formed by each of the two synthesis surfaces described above in each synthesis optical system PR, similar to the case illustrated in FIG. 5, the direction in which the cross axis $CX_L$ extends in the image formation unit 10a is the $Y_L$ direction, and the direction in which the cross axis $CX_R$ extends in the image formation unit 10b is the $Y_R$ direction. In the present configuration, the $Y_L$ direction and the $Y_R$ direction are the direction of intersecting the virtual plane VP1, that is, a non-parallel direction with respect to the virtual plane VP1. In other words, the cross axis $CX_L$ and the cross axis $CX_R$ that are intersecting axes intersect a plane perpendicular to a first direction DR1 in which the display optical system 2L that is the first display optical system, and the display optical system 2R that is the second display optical system are arranged. As described above, the intersecting axis in the virtual-image display apparatus in the present embodiment can also be specified from the relationship with the arrangement of a left-right pair of display optical systems.

Further, in the description above, the display optical system is an optical system based on a projection optical system constituted by a single lens or a plurality of lens groups, and a light-guiding optical system constituted by a light-guiding plate having a plurality of reflection surfaces, however, the invention is not limited thereto, for example, an optical system based on various aspects, such as an optical system using a single mirror, or a diffraction element such as a hologram, etc. can be applied as the display optical system.

The entire disclosure of Japanese Patent Application No. 2018-052136, filed Mar. 20, 2018 is expressly incorporated by reference herein.

What is claimed is:
1. A virtual-image display apparatus, comprising:
a plurality of image elements configured to emit light of different wavelength bands to display an image;
a synthesis optical system configured to synthesize the light from the image elements to form image light; and
a display optical system configured to allow visual recognition of a virtual image formed on the display optical system by the image light passing through the synthesis optical system, wherein
the display optical system includes a first display optical system configure for a left eye of a user to observe the virtual image and a second display optical system configured for a right eye of the user to observe the virtual image, in the synthesis optical system, an intersecting axis along which a synthesis surface for synthesizing the light from the image elements intersects another synthesis surface for synthesizing the light from the image elements extends along a direction in which the first display optical system and the second display optical system are arranged, and the intersecting axis is perpendicular to a direction in which the image light formed by the synthesis optical system exits the synthesis optical system.

2. The virtual-image display apparatus according to claim 1, wherein in the image elements, a light emitting surface is rectangularly shaped with a direction along the intersecting axis as a long-side direction.

3. The virtual-image display apparatus according to claim 1, wherein in the image elements, a divergence angle of emitted light is larger in a direction of the intersecting axis than in a direction perpendicular to the intersecting axis.

4. The virtual-image display apparatus according to claim 1, wherein when the divergence angle of the light from the image elements in the direction of the intersecting axis is equal to the divergence angle of the light from the image elements in the direction perpendicular to the intersecting axis, the display optical system is configured to set an angle range at which the light from the image elements is let in to be larger in the direction of the intersecting axis than in the direction perpendicular to the intersecting axis.

5. The virtual-image display apparatus according to claim 1, wherein the display optical system is configured to allow image light having an eye ring shape in which a direction corresponding to the direction of the intersecting axis is the long axis direction to enter the eyes of an observer.

6. The virtual-image display apparatus according to claim 5, wherein the eye ring shape is an elliptical shape in which a direction corresponding to the direction of the intersecting axis is a long axis.

7. The virtual-image display apparatus according to claim 1, wherein the image elements are self-emitting elements.

8. The virtual-image display apparatus according to claim 7, wherein the image elements are organic EL elements.

9. The virtual-image display apparatus according to claim 1, wherein the display optical system includes a projection optical system configured to project image light passing through the synthesis optical system and a light-guiding optical system configured to guide image light from the projection optical system to a light emission side.

10. The virtual-image display apparatus according to claim 1, wherein the image elements include a first image element configured to emit light of red-color wavelength band, a second image element configured to emit light of blue-color wavelength band, and a third image element configured to emit light of green-color wavelength band, the synthesis optical system includes a first reflection surface and a second reflection surface included in the synthesis surface and is configured to reflect the red-color light from the first image element and the blue-color light from the second image element on the first reflection surface and the second reflection surface, respectively, and to transmit the green-color light from the third image element in the first reflection surface and the second reflection surface, and as for the red-color light from the first image element, and the blue-color light from the second image element, a divergence angle and wavelength bandwidth are determined in accordance with reflection characteristics of the first reflection surface and the second reflection surface.

11. A virtual-image display apparatus, comprising:

a first image element;

a second image element;

a third image element;

a synthesis optical system configured to synthesize light from the first image element, the second image element, and the third image element to form image light; and a first display optical system and a second display optical system configured to allow the image light to enter and configured to display a virtual image formed from the image light, wherein the first display optical system is configure for a left eye of a user to observe the virtual image and the second display optical system is configure for a right eye of the user to observe the virtual image, the synthesis optical system includes a first synthesis surface and a second synthesis surface for synthesizing the light from the first image element, the second image element, and the third image element, an intersecting axis of the first synthesis surface and the second synthesis surface intersects a plane perpendicular to a first direction in which the first display optical system and the second display optical system are arranged, the intersecting axis is an axis along which the first synthesis surface and the second synthesis surface intersects, and the intersecting axis is perpendicular to a direction in which the image light formed by the synthesis optical system exits the synthesis optical system.

12. A virtual-image display apparatus, comprising:

a plurality of image elements configured to emit light of different wavelength bands to display an image;

a synthesis optical system that includes a first synthesis surface and a second synthesis surface configured to synthesize the light from the image elements to form image light; and a display optical system configured to allow visual recognition of a virtual image formed on the display optical system by the image light passing through the synthesis optical system, wherein the display optical system includes a first display optical system configure for a left eye of a user to observe the virtual image and a second display optical system configured for a right eye of the user to observe the virtual image, in the synthesis optical system, an intersecting axis of the first synthesis surface and the second synthesis surface extends along a direction in which the first display optical system and the second display optical system are arranged, the intersecting axis is an axis along which the first synthesis surface and the second synthesis surface intersects, and the intersecting axis is perpendicular to a direction in which the image light formed by the synthesis optical system exits the synthesis optical system.

\* \* \* \* \*